US011241842B2

(12) United States Patent
Gandhi et al.

(10) Patent No.: US 11,241,842 B2
(45) Date of Patent: Feb. 8, 2022

(54) METHODS TO IMPROVE COMPRESSION DURING MICROWAVE HEATING

(71) Applicant: Toyota Motor Engineering & Manufacturing North America, Inc., Plano, TX (US)

(72) Inventors: Umesh N. Gandhi, Farmington Hills, MI (US); Michael Paul Rowe, Pinckney, MI (US); Yuyang Song, Ann Arbor, MI (US)

(73) Assignee: Toyota Motor Engineering & Manufacturing North America, inc., Plano, TX (US)

( * ) Notice: Subject to any disclaimer, the term of this patent is extended or adjusted under 35 U.S.C. 154(b) by 441 days.

(21) Appl. No.: 16/256,569

(22) Filed: Jan. 24, 2019

(65) Prior Publication Data
US 2020/0238629 A1    Jul. 30, 2020

(51) Int. Cl.
*B29C 65/14*    (2006.01)
*B29C 65/00*    (2006.01)

(52) U.S. Cl.
CPC ...... *B29C 65/1425* (2013.01); *B29C 66/7392* (2013.01); *B29C 66/7444* (2013.01)

(58) Field of Classification Search
None
See application file for complete search history.

(56) References Cited

U.S. PATENT DOCUMENTS

| | | | | |
|---|---|---|---|---|
| 5,597,435 A | * | 1/1997 | Desautels | B29C 70/549 156/245 |
| 2014/0246141 A1 | * | 9/2014 | Oldroyd | B29C 70/347 156/175 |
| 2016/0068441 A1 | * | 3/2016 | Backhaus-Ricoult | C04B 35/478 55/523 |
| 2018/0117801 A1 | * | 5/2018 | Rhyne | B29D 30/02 |
| 2018/0154598 A1 | * | 6/2018 | Kurtz | B29D 35/122 |

OTHER PUBLICATIONS

Mitra, A. et al., "Comparison on Mechanical Properties of Microwave Cured Polypropylene Composites Reinforced With Hemp With Compression Moulding Technique," Imp. J. Interdis. Res., vol. 2, Issue 7, pp. 1138-1146 (2016).
Ota, T. et al., "High thermal expansion KAlSiO4 ceramic", J. Mater. Sci., 31, pp. 1431-1433 (1996) (Abstract only).

* cited by examiner

*Primary Examiner* — Peter L Vajda
*Assistant Examiner* — Adrianna N Konves
(74) *Attorney, Agent, or Firm* — Christopher G. Darrow; Darrow Mustafa PC

(57) ABSTRACT

Methods for microwave melting of fiber mixtures to form composite materials include placing the fiber mixture in a receptacle located in a microwave oven. The methods further include microwave heating the mixture, causing a heat activated compression mechanism to automatically increase compressive force on the mixture, thereby eliminating air and void volumes. The heat activated compression mechanism can include a shape memory alloy wire connecting first and second compression brackets, or one or more ceramic blocks configured to increase in volume and thereby increase compression on the mixture.

9 Claims, 4 Drawing Sheets

METHODS TO IMPROVE COMPRESSION DURING MICROWAVE HEATING

TECHNICAL FIELD

The present disclosure generally relates to methods for forming composite materials and, more particularly, to methods to improve compression during microwave heating of thermoplastic particles for the formation of composites.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Fiber mixtures, such as carbon and nylon fiber, can be heated in a microwave oven to form a composite material. Such microwave irradiation can heat the reinforcing carbon fiber, the heat then transferring to the nylon fiber, melting the latter and causing it to form a continuous matrix around the reinforcing material. In the absence of compressive pressure, air pockets and void volumes are likely to be present. Therefore, compressive pressure is required in order to avoid this. Because the fiber mixture will tend to decrease in volume during heating/melting, an apparatus applying compressive pressure must be adjusted in order to maintain consistent compressive pressure. Manually tightenable brackets can be used to provide this pressure, however they require user intervention and necessarily involve stopping the heating and delaying the process.

Accordingly, it would be desirable to provide systems and methods for automatically applying and increasing compressive pressure to a fiber mixture during microwave heating in the formation of a composite material.

SUMMARY

This section provides a general summary of the disclosure, and is not a comprehensive disclosure of its full scope or all of its features.

In various aspects, the present teachings provide a method for forming a composite material having reinforcing carbon fibers enmeshed in a thermoplastic matrix. The method includes a step of providing a mixture of carbon fibers and thermoplastic fibers in a receptacle having a temperature responsive compression element, configured to exert compressive force on the mixture. The temperature responsive compression element is selected from the group consisting of: at least one ceramic element having a positive thermal expansion coefficient; and at least one shape memory alloy (SMA) wire. The method also includes a step of microwave heating the mixture and the temperature responsive compression element, causing the thermoplastic to melt, and the temperature responsive compression element to exert progressively increasing compression on the mixture.

In other aspects, the present teachings provide a system for microwave melting a mixture of carbon fiber and thermoplastic fiber to form a composite material having a thermoplastic matrix impregnated with reinforcing carbon fiber. The system includes a microwave oven; and a receptacle positioned within the microwave oven, the receptacle configured to contain the mixture. The receptacle includes first and second compression brackets configured to apply compressive force to the mixture. The receptacle also includes at least one ceramic element having a positive thermal expansion coefficient, and configured to increase compressive force applied by the compression brackets to the mixture in response to microwave heating.

In still other aspects, the present teachings provide a system for microwave melting a mixture of carbon fiber and thermoplastic fiber to form a composite material having a thermoplastic matrix impregnated with reinforcing carbon fiber. The system includes a microwave oven; and a receptacle positioned within the microwave oven, the receptacle configured to contain the mixture and including. The receptacle also includes first and second compression brackets configured to apply compressive force to the mixture. The system includes at least one shape memory alloy (SMA) wire connected to each of the first and second compression brackets, and configured to increase compressive force applied by the compression brackets to the mixture in response to microwave heating.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

Methods and devices of the present teachings enable active compression, with automatic, heat-induced tightening of a mix of fibers during microwave heating in the formation of a thermoplastic composite material. Thermoplastic composite materials can be formed by microwave heating of a mixture of carbon fiber and nylon, resulting in melting of the nylon to form the composite matrix. Compression of the material in situ during heating is desirable in order to remove voids and/or air pockets that could otherwise be formed.

Devices of the present teachings include a receptacle with a clamp apparatus having first and second opposing clamp elements configured to compress a material mixture held in the receptacle. At least one heat-activated compression enhancer automatically tightens the clamp in response to microwave heating maintains consistent pressure on the material mixture as it melts and loses volume. The heat-activated compression enhancer can include a shape memory alloy (SMA) wire, connecting the first and second clamp elements, that shortens in response to increasing temperature; and/or a ceramic block, backing or forming a compression element, that expands with increasing temperature.

Figure 1A:
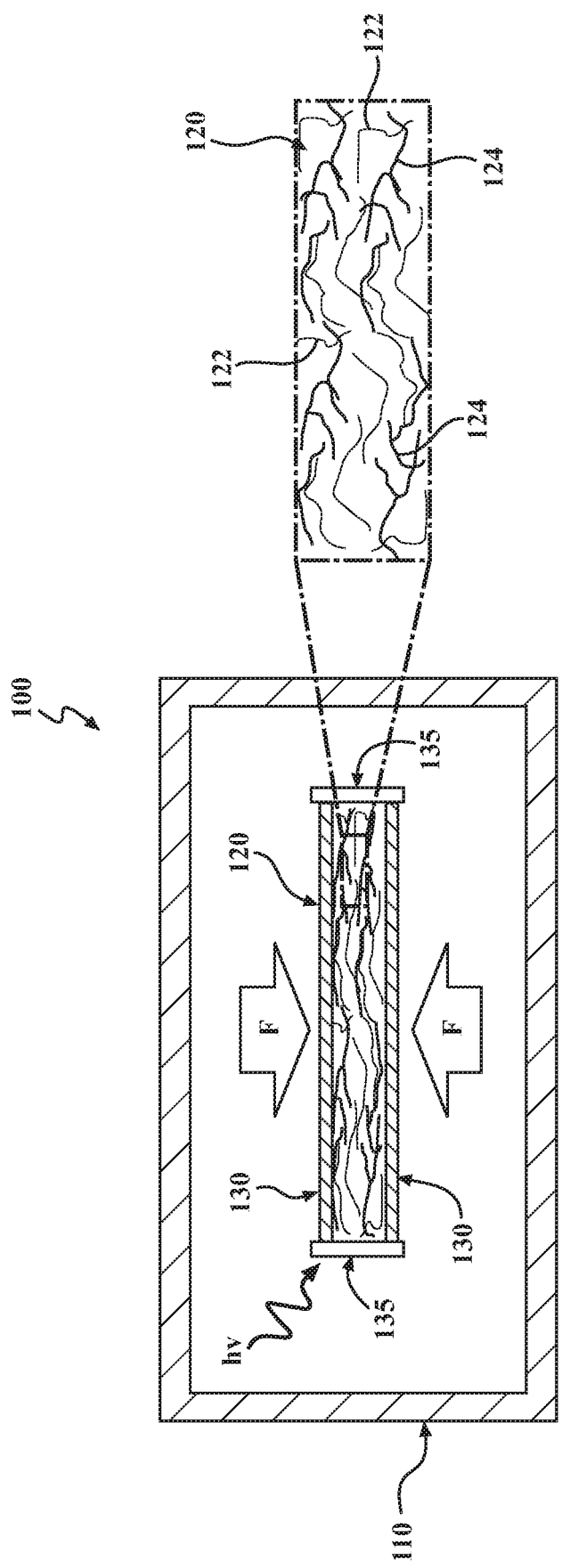
FIG. 1A is a schematic view of a system for microwave melting a fiber mixture to form a composite material, illustrating necessary compression of the material during microwave heating to eliminate voids, and including a magnified portion of the mixture illustrating individual carbon fibers and nylon fibers to be heated.

FIG. 1A shows a side schematic view of a system 100 for microwave melting a mixture 120 of carbon fiber 122 and nylon fiber 124 to form a composite material having a nylon matrix impregnated with reinforcing carbon fiber 122. The system 100 includes a microwave oven 110 configured to directly heat the carbon fiber via microwave irradiation. As the carbon fibers heat due to microwave irradiation, accumulated heat propagates through the material mixture 120, causing the nylon fibers to heat and, eventually, melt. The system of FIG. 1A includes first and second brackets 130 positioned at opposite sides of the mixture 120. FIG. 1A includes an offset showing a magnified portion of the fiber mixture 120. The first and second brackets 130 can be combined with one or more sidewalls 135 to form a receptacle 137, configured to receive and/or hold the mixture 120.

Figure 1B:
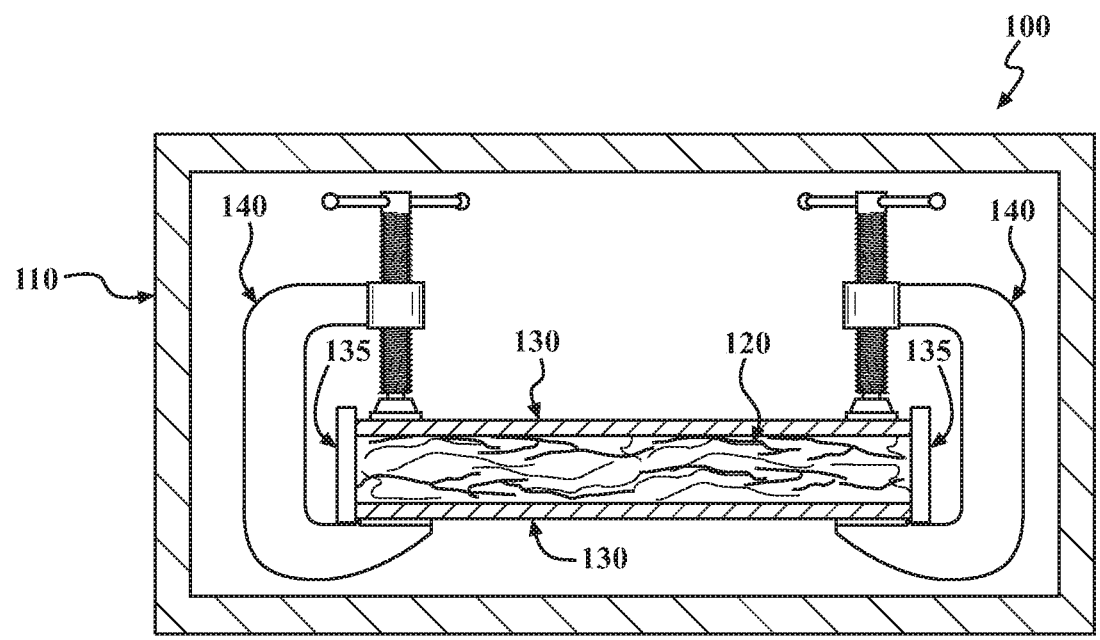
FIG. 1B is a schematic view of the system of FIG. 1A having a clamp for compressing the composite material during heating.

With particular reference to the magnified portion of FIG. 1A, it can be seen that the material mixture 120 contains air pockets, or voids, located between individual carbon fibers 122 and nylon fibers 124. It will thus be understood that it can be desirable to apply a compressive force—indicated by block arrows F in FIG. 1A—to the material mixture during microwave heating. This compressive force can operate to eliminate, or squeeze out, such air pockets as the material mixture 120 melts. FIG. 1B shows a side schematic view of a system 100 comparable to that of FIG. 1A, but equipped with a compression mechanism 140 configured to apply a compressive force to the mixture 120 during microwave heating. In the example of FIG. 1B, the compression mechanism 140 is a clamp, but could alternatively be one or more threaded bolts engaged directly with brackets 130, or any other mechanism configured to apply compressive force to the material mixture 120.

It will be understood that the mixture 120 will tend to compact and shrink, or occupy less volume, as it melts. This is due primarily to the escape, during melting, of air that occupies spaces between solid fibers. Due to this shrinkage, the compression mechanism 140 of FIG. 1B is manually adjustable, having one or more screws, threaded bolts, or other elements that can be manually adjusted to modulate the compressive force applied to the material mixture 120. Thus, as the material mixture 120 shrinks during microwave heating, the manually adjustable compression mechanism 140 can be tightened in order to maintain consistent compressive force on the material mixture 120. It will be understood that such an approach generally requires that microwave heating be stopped to allow for manual adjustment of the compression mechanism 140, leading to longer and more demanding fabrication processes.

Figure 2A:
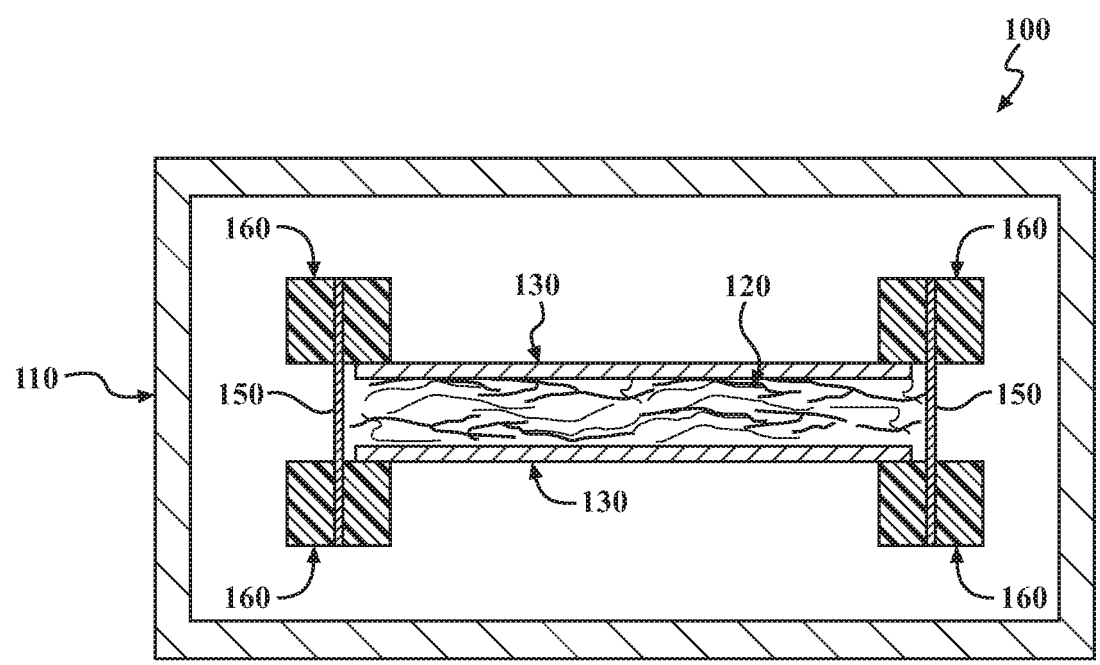
FIG. 2A is a schematic view of a system of the present teachings for microwave curing a composite material, having shape memory alloy (SMA) wires for automatic tightening and consistent compressive pressure during microwave heating.
Figure 2B:
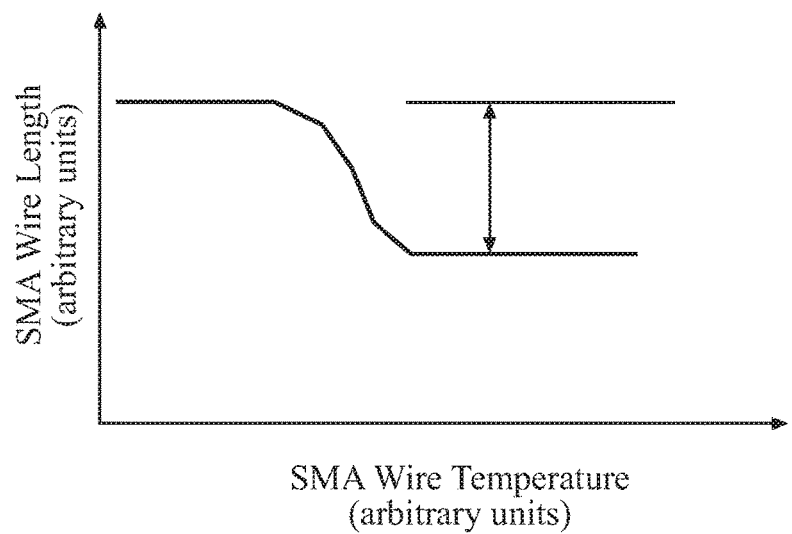
FIG. 2B is a generic plot of shape memory alloy wire shrinkage during heating as a function of temperature.

FIG. 2A is a schematic view of a system of the present teachings for microwave curing a composite material, having a heat-responsive compression mechanism for maintaining consistent compressive force on a material mixture 120 during microwave heating. The system 100 of FIG. 2A includes first and second brackets 130 positioned at opposite sides of the material mixture 120 inside a microwave oven 110, as described above in reference to FIG. 1A. The system 100 of FIG. 2A further includes one or more shape memory alloy (SMA) wires 150 configured to decrease in length upon being heated to a phase transition temperature, $T_{SMA}$ as depicted in FIG. 2B showing a plot of SMA wire length vs. temperature. In some implementations, an SMA wire 150 can experience a decrease in length of from about four percent to about 8 percent when heated from a temperature less than $T_{SMA}$ to a temperature greater than $T_{SMA}$.

In the example of FIG. 2A, the SMA wires 150 are integrated into members 160 configured to apply compressive force to the brackets 130, but it will be understood that the SMA wires could alternatively be integrated directly into the brackets 130, or in any other configuration facilitating application of compressive force on the material mixture 120 by the SMA wires 150. The one or more SMA wires 150 will be heated during microwave heating of the material mixture 120, due substantially to the transfer of heat accumulated in the material mixture 120 to the SMA wires 150. As the one or more SMA wires 150 are heated and reach the phase transition temperature, $T_{SMA}$, the SMA wires 150 will shorten and thereby increase the compressive force on the material mixture 120.

In many implementations, it will be desirable that $T_{SMA}$ be similar to the glass transition temperature of the thermoplastic polymer (e.g. nylon) contained in the material mixture 120. This is because the material mixture 120 can begin to shrink when it reaches the glass transition temperature of the thermoplastic polymer, as the material softens and settles, and trapped air is released. As such, matching of TSMA to the glass transition temperature of the thermoplastic polymer can cause the heat activated compression mechanism to tighten just as the material mixture shrinks, such that consistent compressive force is maintained automatically. Different SMA materials can be used in the SMA wires 150 to achieve this balance, suitable SMAs can including, without limitation, nickel-titanium (Ni—Ti, or nitinol), Cu—Al—Ni, Fe—Mn—Si, and Cu—Zn—Al. In many implementations, the SMA wires can have a stiffness of about 70 gigapascals, similar to the stiffness of aluminum.

Figure 3A:
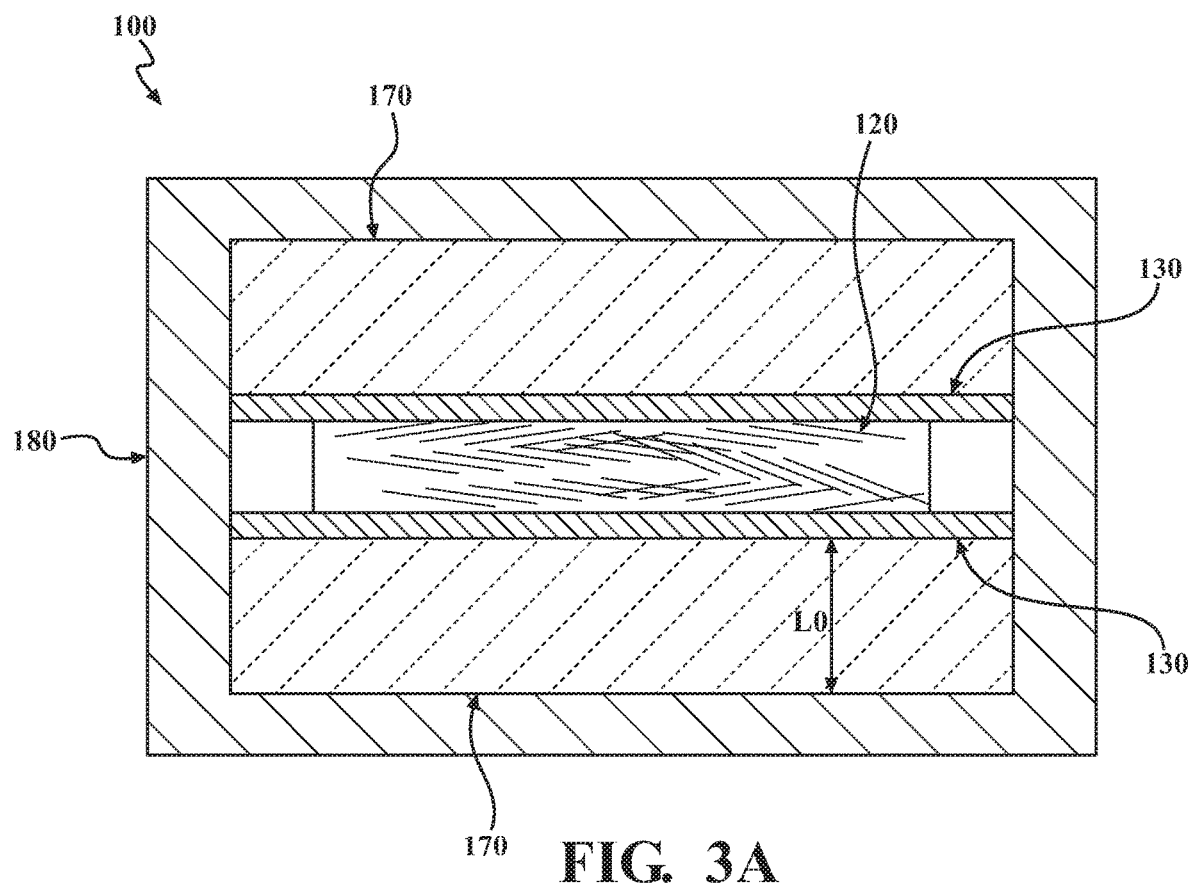
FIG. 3A is a schematic view of a system of the present teachings for microwave curing a composite material, having ceramic blocks for automatic tightening and consistent compressive pressure during microwave heating.

FIG. 3A shows a schematic view of another system of the present teachings for microwave curing a composite material, having an alternative heat-responsive compression mechanism for maintaining consistent compressive force on a material mixture 120 during microwave heating. The system 100 of FIG. 3A also includes first and second brackets 130 positioned at opposite sides of the material mixture 120 inside a microwave oven 110, as described above in reference to FIGS. 1A and 2A. The system 100 of FIG. 3A further includes two ceramic blocks 170 that can expand with an increase in heat, and configured to apply increasing compressive force on the material mixture 120 and/or maintain consistent compressive force on the material mixture 120 as the material mixture 120 shrinks during heating.

While the example of FIG. 3A shows two ceramic blocks 170, positioned on opposite sides of the material mixture 120 and contacting the compression brackets 130, the system could alternatively have one ceramic block 170 or more than two ceramic blocks 170. The one or more ceramic blocks 170 are constrained in a frame 180, such that linear thermal expansion during heating is converted to stress, or compressive force, applied to the material mixture 120. The ceramic may be directly heated, or heated indirectly by the material mixture and, because the microwave heating is relatively rapid, the application of compressive force to the material mixture 120 can be rapid as well.

It will further be appreciated that the ceramic block(s) 170 need not necessarily be rectangular prisms, but can be any suitable shape, and can generally be referred to as "ceramic elements." The one or more ceramic blocks 170 can be of any shape suitable to enable application of consistent compressive force across a surface of the material mixture and/or a compression bracket 130. For example, a ceramic block 170 could be cylindrical, disk shaped, or rectangular prism. The frame 180, alternatively referred to herein as a "restraining structure", can be a rigid structure that contacts a ceramic block 170 on multiple sides, restraining the ceramic block 170 from expanding in the direction of the sides so contacted, and thereby forcing expansion in the direction of side(s) not contacted by the restraining structure 180. For example, if a ceramic block 170 is a rectangular prism having six sides, the restraining structure 180 could contact three, or four, or five, of the sides, so that expansion can occur only in the direction of uncontacted sides.

Figure 3B:
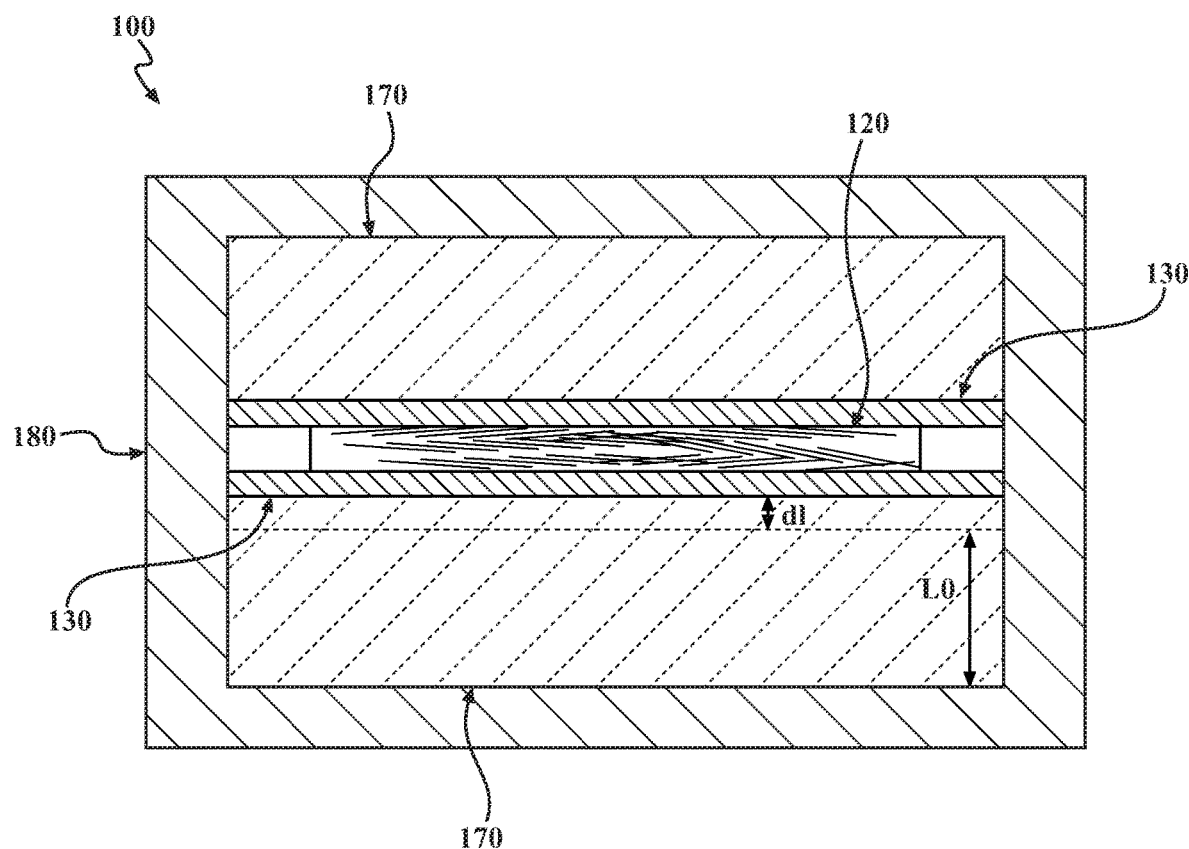
FIG. 3B is a schematic view of the system of FIG. 3A, illustrating thermal expansion of the ceramic blocks to maintain constant pressure during heating.

FIG. 3B shows a schematic view of the system of FIG. 3A, illustrating linear thermal expansion of the ceramic blocks 170 to maintain constant compressive force during heating. It will be noted that ceramic usually has a relatively high linear thermal expansion coefficient, in the range of about $20 \times 10^{-6}$ $K^{-1}$. Linear expansion due to change in temperature can be defined according to Equation 1:

$$dl = \alpha L_0 dt \quad \quad 1;$$

where $\alpha$=the thermal expansion coefficient; $L_0$=initial length in the unconstrained dimension (i.e. the dimension indicated by the double sided arrow $L_0$ of FIG. 3A); dt=temperature difference; and dl=linear expansion in the unconstrained dimension.

The strain, or deformation, for an unrestricted expansion can be defined according to Equation 2:

$$\varepsilon = dl/L_0 \quad \quad 2;$$

where $\varepsilon$=strain; and dl and $L_0$ are as defined above.

The Elastic modulus (Young's Modulus) can be defined according to Equation 3:

$$E = \sigma/\varepsilon \quad \quad 3$$

where E=Young's Modulus; $\sigma$=stress; and $\varepsilon$ is as defined above. When restricted expansion is "converted" to stress (i.e. the one or more ceramic blocks 170 expand while constrained by the frame 180), then Equations 1, 2, and 3 can be combined to yield Equation 4:

$$\sigma dt = E\varepsilon = Edl/L_0 E\alpha L_0 = E\alpha L_0 dt/L_0 = E\alpha dt \quad \quad 4;$$

where $\sigma$dt=stress, or compressive force applied to the material mixture 120, due to change in temperature). For example, if constrained ceramic blocks 170 having a thermal coefficient of expansion of $12 \times 10^{-5}$ $K^{-1}$ and an initial length in the unconstrained dimension of 20 mm are heated from a first temperature to a second temperature that is 200° C. greater than the first temperature, they will elongate in the unconstrained dimension by 0.048 mm. This will produce 5040 MPa of stress. In different variations, the ceramic element 170 can have a thermal coefficient of expansion of at least $1 \times 10^{-5}$ $K^{-1}$, or at least $10 \times 10^{-5}$ $K^{-1}$, in at least one dimension.

Also disclosed is a method for forming a composite material having reinforcing carbon fibers enmeshed in a nylon matrix. The method includes a step of providing a mixture of carbon fibers and nylon fibers in a receptacle having a temperature responsive compression element, configured to exert compressive force on the mixture 120. The temperature responsive compression element can be selected from the group consisting of: at least one ceramic element having a positive thermal expansion coefficient; and at least one shape memory alloy (SMA) wire. The method further includes a step of microwave heating the mixture and the temperature responsive compression element, causing the nylon to melt, and the temperature responsive compression element to exert progressively increasing compression on the mixture.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A method for forming a composite material having reinforcing carbon fibers enmeshed in a thermoplastic matrix, the method comprising:
providing a mixture of carbon fibers and thermoplastic fibers in a receptacle having a temperature responsive compression element, configured to exert compressive force on the mixture, and comprising at least one ceramic element having a positive thermal expansion coefficient; and
microwave heating the mixture and the temperature responsive compression element, causing the thermoplastic to melt, and the temperature responsive compression element to exert progressively increasing compression on the mixture.

2. The method as recited in claim 1, wherein the at least one ceramic element comprises at least two ceramic elements positioned on opposite sides of the receptacle.

3. The method as recited in claim 1, wherein the at least one ceramic element is contacted by a restraining element, such that microwaving causes the at least one ceramic element to exert a force on the mixture.

4. The method as recited in claim 1, wherein the thermoplastic fibers comprise nylon fibers.

5. A system for microwave melting a mixture of carbon fiber and thermoplastic fiber to form a composite material having a thermoplastic matrix impregnated with reinforcing carbon fiber, the system comprising:
a microwave oven;
a receptacle positioned within the microwave oven, the receptacle configured to contain the mixture and including first and second compression brackets configured to apply compressive force to the mixture; and
at least one ceramic element having a positive thermal expansion coefficient, and configured to increase compressive force applied by the first and second compression brackets to the mixture in response to microwave heating.

6. The system as recited in claim 5, wherein the at least one ceramic element comprises at least two ceramic elements positioned on opposite sides of the receptacle.

7. The system as recited in claim 5, comprising a restraining structure that contacts the at least one ceramic element on multiple sides, restraining the ceramic element from expanding in a direction of the sides so contacted, and thereby forcing expansion in a direction not contacted by the restraining structure.

8. The system as recited in claim 5, wherein the at least one ceramic element has a thermal coefficient of expansion of at least $1 \times 10^{-5}$ $K^{-1}$.

9. The system as recited in claim 5, wherein the at least one ceramic element has a thermal coefficient of expansion of at least $10 \times 10^{-5}$ $K^{-1}$.

* * * * *

UNITED STATES PATENT AND TRADEMARK OFFICE
CERTIFICATE OF CORRECTION

PATENT NO. : 11,241,842 B2
APPLICATION NO. : 16/256569
DATED : February 8, 2022
INVENTOR(S) : Umesh N. Gandhi, Michael Paul Rowe and Yuyang Song Page 1 of 1

It is certified that error appears in the above-identified patent and that said Letters Patent is hereby corrected as shown below:

In the Specification

Column 5, Line 58: delete "$\sigma dt = E\varepsilon = Edl/L_0 E\alpha L_0 = E\alpha L_0 dt/L_0 = E\alpha dt$" and insert
-- $\sigma dt = E\,\varepsilon = E\,dl\,/\,L_0 = E\,\alpha\,L_0\,dt\,/\,L_0 = E\,\alpha\,dt$ --

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*